United States Patent
Patil et al.

(10) Patent No.: US 9,563,529 B2
(45) Date of Patent: Feb. 7, 2017

(54) SELECTIVE MONITORING OF ARCHIVE AND BACKUP STORAGE

(71) Applicant: INTERNATIONAL BUSINESS MACHINES CORPORATION, Armonk, NY (US)

(72) Inventors: Sandeep R. Patil, Pune (IN); Riyazahamad M. Shiraguppi, Pune (IN); Gandhi Sivakumar, Victoria (AU); Matthew A. Terry, Dunwoody, GA (US); Matthew B. Trevathan, Roswell, GA (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 66 days.

(21) Appl. No.: 14/715,719

(22) Filed: May 19, 2015

(65) Prior Publication Data
US 2015/0254156 A1    Sep. 10, 2015

Related U.S. Application Data

(63) Continuation of application No. 13/757,127, filed on Feb. 1, 2013, now Pat. No. 9,063,966.

(51) Int. Cl.
G06F 11/00 (2006.01)
G06F 11/30 (2006.01)
G06F 11/07 (2006.01)

(52) U.S. Cl.
CPC ....... *G06F 11/3034* (2013.01); *G06F 11/3058* (2013.01); *G06F 11/079* (2013.01); *G06F 11/3096* (2013.01)

(58) Field of Classification Search
CPC .. G06F 11/079; G06F 11/3034; G06F 11/3058
See application file for complete search history.

(56) References Cited

U.S. PATENT DOCUMENTS

| | | | |
|---|---|---|---|
| 5,559,958 | A | 9/1996 | Farrand et al. |
| 5,727,144 | A | 3/1998 | Brady et al. |
| 6,769,022 | B1 | 7/2004 | DeKoning et al. |
| 7,308,534 | B2 | 12/2007 | Mimatsu |
| 7,325,165 | B2 | 1/2008 | Paaske |
| 7,469,326 | B1 | 12/2008 | Hardman |
| 7,987,327 | B2 | 7/2011 | Awai |
| 8,015,441 | B2 | 9/2011 | Desai et al. |
| 8,041,677 | B2 | 10/2011 | Sumner et al. |
| 8,078,918 | B2 | 12/2011 | Diggs et al. |

(Continued)

FOREIGN PATENT DOCUMENTS

CN    102576328    7/2012

*Primary Examiner* — Joseph Kudirka
(74) *Attorney, Agent, or Firm* — Christopher K. McLane; Andrew M. Calderon; Roberts Mlotkowski Safran Cole & Calderon, P.C.

(57) ABSTRACT

Systems and methods for providing information security in a network environment. The method includes receiving a user selection of a data section recorded on a storage system. The method further includes determining a monitoring routine for the data section. The method further includes determining a physical location at which the data section is recorded in the storage system. The method further includes monitoring the physical location for faults according to the monitoring routine.

19 Claims, 8 Drawing Sheets

(56) References Cited

U.S. PATENT DOCUMENTS

| | | |
|---|---|---|
| 8,959,401 B2 | 2/2015 | Kato |
| 2008/0239537 A1 | 10/2008 | Mori |
| 2009/0006911 A1 | 1/2009 | Wang et al. |
| 2009/0164853 A1* | 6/2009 | Gokhale ............. G06F 11/0709 714/57 |
| 2010/0174878 A1 | 7/2010 | Davis et al. |
| 2010/0274983 A1 | 10/2010 | Murphy et al. |
| 2011/0246837 A1 | 10/2011 | Kato |
| 2013/0047039 A1 | 2/2013 | Manes et al. |

* cited by examiner

SELECTIVE MONITORING OF ARCHIVE AND BACKUP STORAGE

FIELD OF THE INVENTION

The invention relates to information storage and, more specifically, to protecting stored data from loss and corruption.

BACKGROUND

Data archiving is a process of moving stored data that is not currently used to a separate data storage device for long-term retention. For example, data archives may include older data that is still important and necessary for future reference, as well as data that must be retained for regulatory compliance. Occasional access to this data may be necessary. As such, data archives are indexed so that the data (and parts thereof) can be readily located and retrieved. In contrast to data archives, data backups are copies of data used to recover data that is lost or corrupted. Backups are also used to recover data according to data retention policies.

Archive data and backup data (i.e., archive/backup data) in networked systems are often stored on devices that are not part of mainstream traffic. To conserve power, these storage devices may not always be powered-on except for occasions when data or read/write request is received.

Magnetic data storage devices are often used to store archive data and backup data (i.e., archive/backup data). A hard disk drive (i.e., "hard drive" or "hard disk") is a non-volatile, random access digital magnetic data storage device. It includes rotating rigid platters on a motor-driven spindle within a protective enclosure. Data is magnetically read from and written to the platter by read/write heads that float on a film of air above the platters. Hard disk drives record data by magnetizing ferromagnetic material directionally. Sequential changes in the direction of magnetization represent patterns of binary data bits. The data is read from the disk by detecting transitions in magnetization and decoding the originally written data.

A failure of a hard disk drive can result in a loss or corruption of data. Such failures can be due to, for example: input/output stress to the hard drive, high-voltage fluctuations, physical shocks (drops, bangs, etc.), local magnetic fields (e.g., strong magnets, magnetic fields, and the like), age (most drives have a 3-5 year time-before-failure construction materials), and problem with associated devices (e.g., cooling systems, air filters).

Self-Monitoring Analysis and Reporting Technology ("SMART") was developed to increase the reliability of hard disk drives. SMART predicts failures by incorporating diagnostics into hard disk drives that monitor the internal operations. When SMART detects a potential failure, the hard disk drive can be repaired or replaced before any data stored on the hard disk drive is lost or damaged.

While SMART may predict failures of hard disk drives, the data stored on the hard disk drives may not be actively monitored. For example, when a system stores data on a hard disk drive, it may verify that no errors occurred during transmission and/or storage. However, the data may be subsequently exposed to various sources of loss or corruption, including power fluctuations (e.g., during power-up and power-down), environmental changes (e.g., temperature changes, moisture, dusts, etc.), mechanical wear and tear (e.g., problem with air filters, exhaust fans, aging, etc.), and human activities (e.g., physical relocation, placement of nearby objects that affect magnetic fields, etc.). Any such loss or corruption may not be detected occur for a substantial period of time (e.g., when a request to read data occurs).

SUMMARY

In a first aspect of the invention, a method includes receiving a user selection of a data section from data sections recorded on a storage system. The method further includes determining by a computer device a monitoring routine for the data section. The method further includes determining by the computer device a physical location at which the data section is recorded in the storage system. The method further includes monitoring by the computer device the physical location for faults according to the monitoring routine.

In another aspect of the present invention, a system for selective monitoring of stored information includes a configuration module, a monitoring apparatus, and a storage system. The configuration module determines a monitoring routine for a user-selected data section, and determines a physical location at which the user-selected data section is recorded in the storage system. Further, the monitoring apparatus receives the monitoring routine and the physical location from the configuration module, and monitors the physical location for faults according to the monitoring routine.

In accordance with additional aspects of the present invention, a computer program product for selective monitoring of stored information is provided. The computer program product includes one or more computer-readable, tangible storage devices. Further, the computer program product includes program instructions, stored on at least one of the storage devices, to determine respective monitoring routines for user-selected data sections recorded in a storage system. Further, the computer program product includes program instructions, stored on at least one of the storage devices, to determine physical locations of the storage system at which the plurality of user-selected data sections are recorded in the storage system. Further, the computer program product includes program instructions, stored on at least one of the storage devices, to monitor the physical locations for faults based on the monitoring routines.

In accordance with additional aspects of the present invention, a computer system for selective monitoring of stored information includes a CPU, a computer readable memory, and a computer readable storage media. The system further includes program instructions to present data sections recorded in a storage system for selection by a user. The system further includes program instructions to receive from the user selections of one or more of the data sections and importance levels corresponding to each of the one or more of the data sections. The system further includes program instructions to determine monitoring routines for the one or more of the data sections based on the corresponding importance levels. The system further includes program instructions to determine physical locations of the one or more of the data sections. The system further includes program instructions to monitor the physical locations for faults based on the monitoring routines. The program instructions are stored on the computer readable storage media for execution by the CPU via the computer readable memory.

In accordance with additional aspects of the present invention, a method of deploying a system for selective monitoring of stored information includes providing a computer infrastructure. The computer infrastructure determines respective monitoring routines for user-selected data sections recorded in a storage system based on respective importance levels received from a user. Further, the computer infrastructure determines respective physical locations in the storage system at which the user-selected data sections are recorded. Further, the computer infrastructure determines that a first data section of the plurality of user-selected data sections is scheduled for monitoring based on one of the respective monitoring routines corresponding to the first data section. Further, the computer infrastructure measures one or more fault parameters at a first physical location of the respective physical locations corresponding to the first data section. Further, the computer infrastructure performs a corrective action when the one or more fault parameters measured at the first physical location exceed a corresponding threshold value.

BRIEF DESCRIPTION OF THE SEVERAL VIEWS OF THE DRAWINGS

The present invention is described in the detailed description that follows, in reference to the noted plurality of drawings by way of non-limiting examples of exemplary embodiments of the present invention.

DETAILED DESCRIPTION

Figure 1:
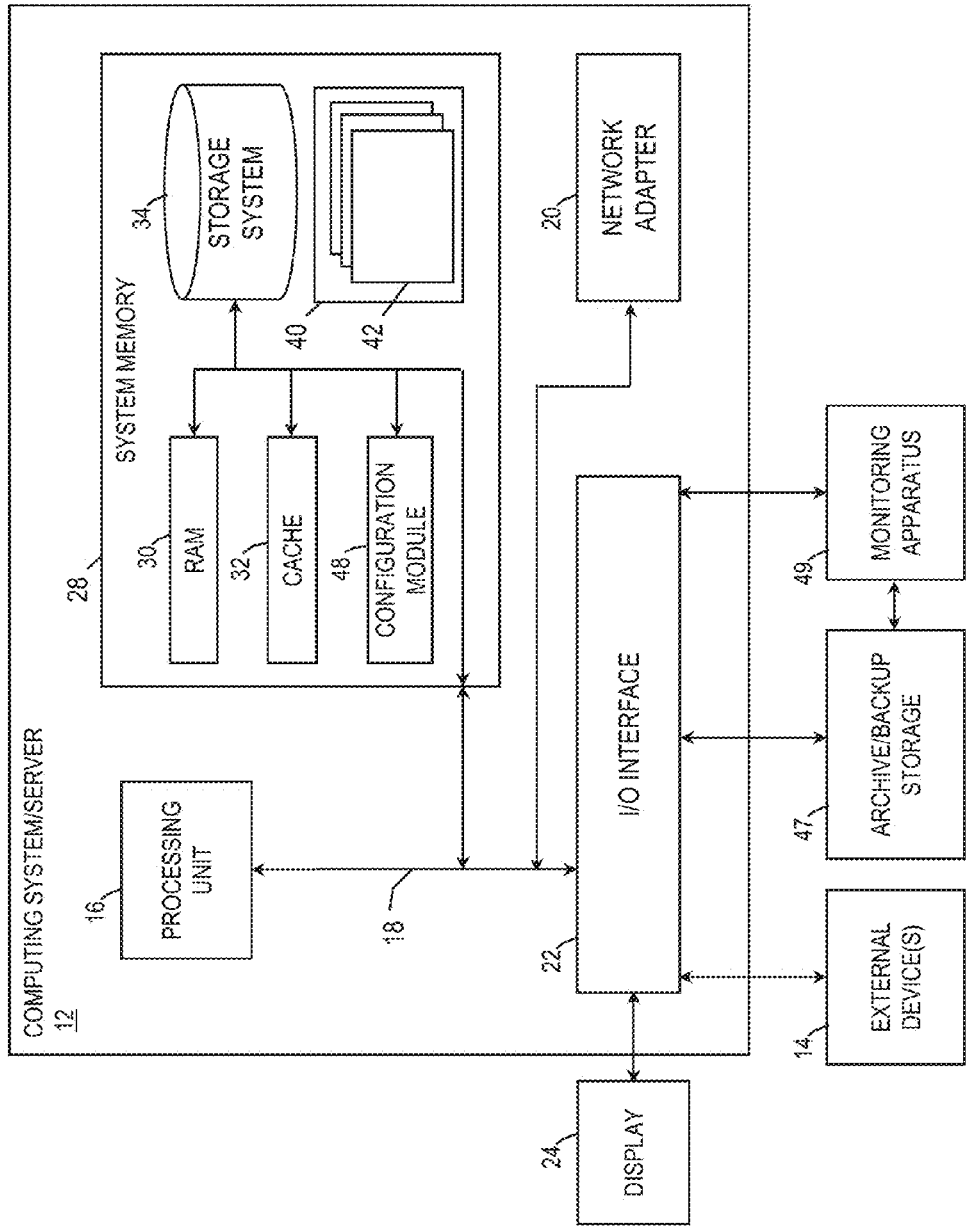
FIG. 1 shows a hardware configuration in accordance with aspects of the present invention.

The invention relates to information storage and, more specifically, to protecting stored data from loss and corruption. According to aspects of the invention disclosed herein, user-selected data is protected by routinely monitoring the particular locations within a storage system where the user-selected data is physically located. Monitoring can be performed at the lowest physical level of the storage system (e.g., blocks, tracks, and sectors of individual hard disk drives, etc.). Monitoring includes routinely measuring one or more fault parameters of the physical locations that contain the user-selected data. The fault parameters may include, e.g., magnetic field level, bit error rate, temperature, vibration, and read error rate. In addition, SMART parameters may be measured to check the health of the storage device.

According to aspects of the invention, a user configures the monitoring of a storage system via a computer-user interface provided by a configuration module. The storage system may be an archive/backup storage system that, by its purpose, holds very large quantities (e.g., terabytes) of data for long periods (e.g., multiple years). The configuration module determines data sections stored in an archive/backup storage system and presents them to the user through the computer-user interface. Data sections may include data types, terms, or words (e.g., names, addresses, descriptors). For example, the configuration module may determine names and other such information included in a customer database. Using the computer-user interface, the user can select data sections that are important and/or required to be kept safe. The configuration module may then determine monitoring routines for the selected data sections. The monitoring routines may be determined based on a level of importance assigned to the selected data sections by the user through the computer-user interface.

In accordance with further aspects of the invention, the configuration module determines the physical locations of the selected data sections in the storage system. In embodiments, the monitoring module determines the storage devices in the storage systems that contain the selected data sections and the physical location of the data sections in each of the storage devices. For example, the monitoring module determines the blocks/sectors of hard disk drives that contain the selected data sections using CHS (Cylinder, Head, Sector) or LBA (Logical Block Addressing).

In accordance with further aspects of the invention, a monitoring apparatus monitors devices of the storage system based on the monitoring information determined by the configuration module. In embodiments, according to the determined monitoring routines, the monitoring apparatus measures fault parameters at the physical locations of selected data within the storage devices. For example, each hard disk drive in a storage system may have an associated monitoring device that monitors fault parameters at the determined blocks/sections of user-selected data sections according to a corresponding monitoring routine. In addition, the monitoring devices may monitor the health of the hard disk drives using SMART parameters. If one or more of the fault parameters for a data section exceeds a corresponding threshold value, the monitoring apparatus may take corrective action and/or trigger an alert. Corrective action may include, for example, locally overwriting the data.

Embodiments of the invention make constant monitoring of large storage systems (e.g., archive/backup systems) practical by monitoring a subset of the stored data that is identified by a user as important or required to be kept safe. For example, the user may consider some data (e.g., a customer's identification-number) more important than another (e.g., the customer's language-proficiency). Also, legal or regulatory requirements may demand that the user retain some types of data. Thus, embodiments of the invention operate at the hardware level of a storage system to provide differentiated treatment of information identified as important or required by a user. In cloud-based environments, a tenant of a cloud-based networking information service can configure its respective data, thereby allowing a tenant to maintain control of its data that is stored by the service.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud user can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple users using a multi-tenant model, with different physical and virtual resources dynamically assigned, and reassigned according to demand. There is a sense of location independence in that the user generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the user, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and user of the utilized service.

Service Models are as follows:

Software as a Service (SaaS): the capability provided to the user is to use the provider's applications running on a cloud infrastructure. The applications are accessible from various client devices through a thin client interface such as a web browser (e.g., web-based email). The user does not manage or control the underlying cloud infrastructure including network, servers, operating systems, storage, or even individual application capabilities, with the possible exception of limited user-specific application configuration settings.

Platform as a Service (PaaS): the capability provided to the user is to deploy onto the cloud infrastructure user-created or acquired applications created using programming languages and tools supported by the provider. The user does not manage or control the underlying cloud infrastructure including networks, servers, operating systems, or storage, but has control over the deployed applications and possibly application hosting environment configurations.

Infrastructure as a Service (IaaS): the capability provided to the user is to provision processing, storage, networks, and other fundamental computing resources where the user is able to deploy and run arbitrary software, which can include operating systems and applications. The user does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 1, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, handheld or laptop devices, multiprocessor systems, microprocessor-based systems, set top boxes, programmable user electronics, network PCs, minicomputer systems, mainframe computer systems, and distributed cloud computing environments that include any of the above systems or devices, and the like.

Computer system/server 12 may be described in the general context of computer system executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (e.g., a "hard drive"). Although not particularly shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

As will be appreciated by one skilled in the art, aspects of the present invention, and the functionality provided therein, may be embodied as a system, method or computer program product. Accordingly, aspects of the present invention may take the form of an entirely hardware embodiment, an entirely software embodiment (including firmware, resident software, microcode, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Still referring to FIG. 1, in accordance with aspects of the invention, cloud computing node 10 includes an archive/backup storage 47, a configuration module 48, and a monitoring apparatus 49. Archive/backup storage 47 may include one or more of a tape drive, a disk storage device (e.g., hard disk drive), an optical disk storage device (e.g., a rewritable compact disc), a solid state drive, a flash drive, or an external hard drives, an external disk drive array, and a RAID system. In embodiments, archive/backup storage 47 may be a system used for long-term storage of data (e.g., 3+ years), such as a backup storage or archive storage. It should be noted that while archive/backup storage 47 and monitoring apparatus 49 are illustrated in FIG. 1 as being communicatively linked to computer system/server 12 by I/O interface 22, they may also be communicatively linked to computer system/server 12 by network adapter 20 via the one or more information networks.

Configuration module 48 may be software, hardware or a combination thereof that controls computer system/server 12 to provide a computer-user interface which interacts with a user to configure selective monitoring of information recorded one or more storages systems, including storage system 34 and/or archive/backup storage 47. The functionality of configuration module 48 may be provided by one or more of program modules 42. In embodiments, configuration module 48 provides a computer-user interface (e.g., a graphic user interface on display 24 or some remote computing device) that displays a representation of data recorded on archive/backup storage 47 for selection by a user. For example, configuration module 48 may display the data within the domain of information stored by a cloud computing service for the user (e.g., an employee of a tenant of cloud computing node 10).

Further, configuration module 48 determines a monitoring routine for the selected data. In embodiments, the user assigns monitoring routines to the selected data using the computer-user interface (e.g., interacting with the graphic user interface using one or more of external devices 14 and display 24). Additionally or alternatively, the user assigns an importance level to the selected data, and configuration module 48 determines monitoring routines based on the assigned importance level (e.g., using a lookup table). Additionally or alternatively, configuration module 48 automatically assigns monitoring routines to the selected data based on the type of data (e.g., using keywords to reference monitoring routines in a lookup table). Further, in embodiments, the user can select one or more threshold values corresponding to fault parameters measured by the monitoring apparatus 49.

For the data section selected by the user, configuration module 48 determines the physical location of selected data. That is, configuration module 48 determines the particular storage device that contains the selected data and the physical location of the data at which the data is recorded on that device. For example, where the storage device containing the selected data is one of a number of hard disk drives, configuration module 48 identifies the particular hard disk drive containing the data, and uses CHS (Cylinder, Head, Sector) addressing or LBA (Logical Block Addressing) to identify the particular, physical location of the selected data on that hard disk drive.

Configuration module 48 provides the selected data, the importance levels, the monitoring routines, the threshold values, and/or the physical data locations to monitoring apparatus 49 via, e.g., I/O interface 22, for use in monitoring the storage devices where the data is recorded (e.g., storage system 34 and/or archive/backup storage 47). Monitoring apparatus 49 includes of one or more devices that monitor the state of information stored in one or more data storage devices. For example, monitoring apparatus 49 includes sensors and logic (hardware and/or software) that measure fault parameters (e.g., magnetic field strength, bit error rate, vibration, temperature, etc.) at particular locations of the storage devices and determine whether the particular locations of the storage devices are at risk of failure, and initiate corrective action. In accordance with aspects of the invention, monitoring apparatus 49 monitors the data selected by the user based on the monitoring information received from configuration module 48. For example, based on a monitoring routine or importance level assigned to a data section by the user, monitoring apparatus 49 can periodically measure fault parameters at corresponding physical locations of a storage device (e.g., a storage device contained in archive/backup storage 47). If monitoring apparatus 49 determines that the data may be lost or corrupted based on the measured parameters, monitoring apparatus 49 can initiate corrective action. For example, if monitoring apparatus 49 determines that a particular block/sector of a hard disk drive has magnetic field strength below a corresponding threshold value, monitoring apparatus 49 may rewrite this data and/or issue an alert to the user.

Figure 2:
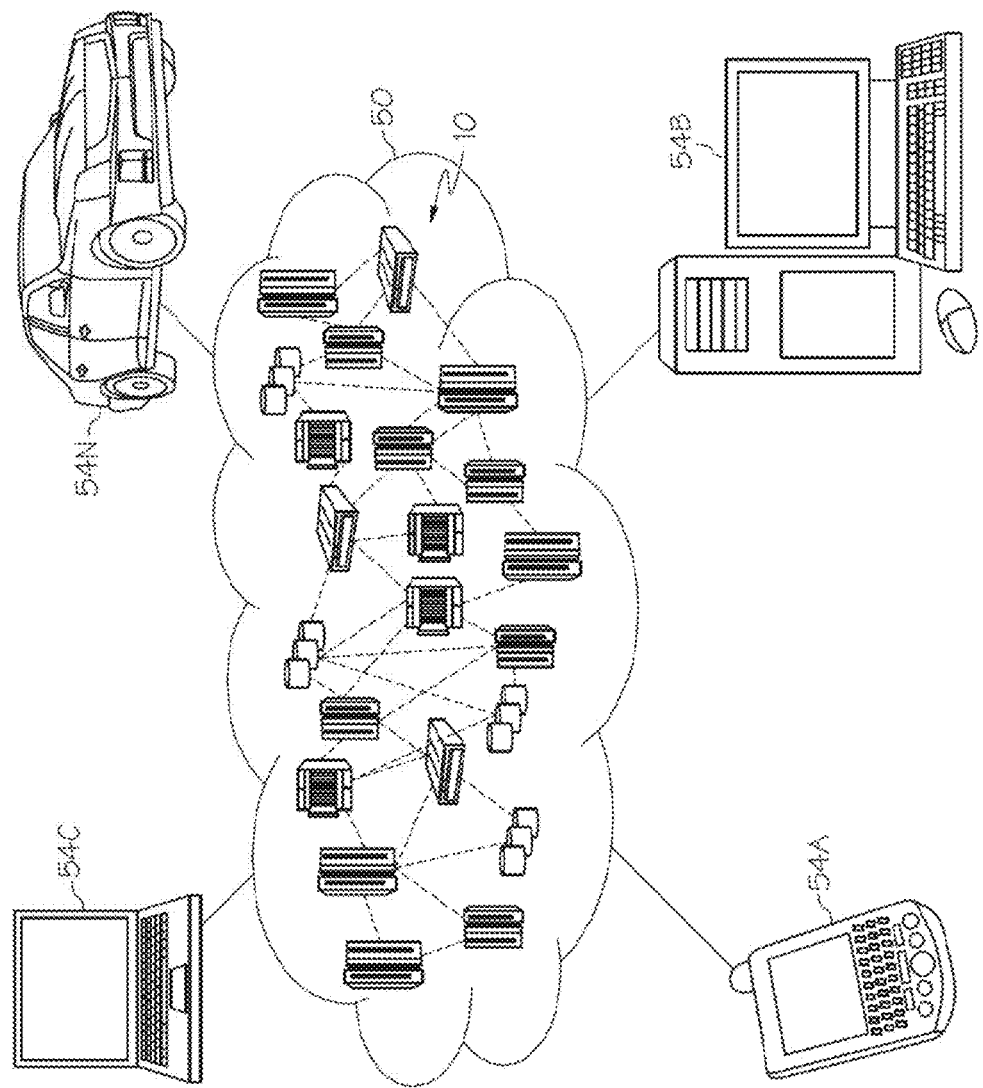
FIG. 2 shows a cloud computing environment in accordance with aspects of the present invention.

Referring now to FIG. 2, an illustrative cloud computing environment 50 is depicted. As shown, cloud computing environment 50 includes one or more cloud computing nodes 10 with which local computing devices used by cloud users, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms, and/or software as services for which a cloud user does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
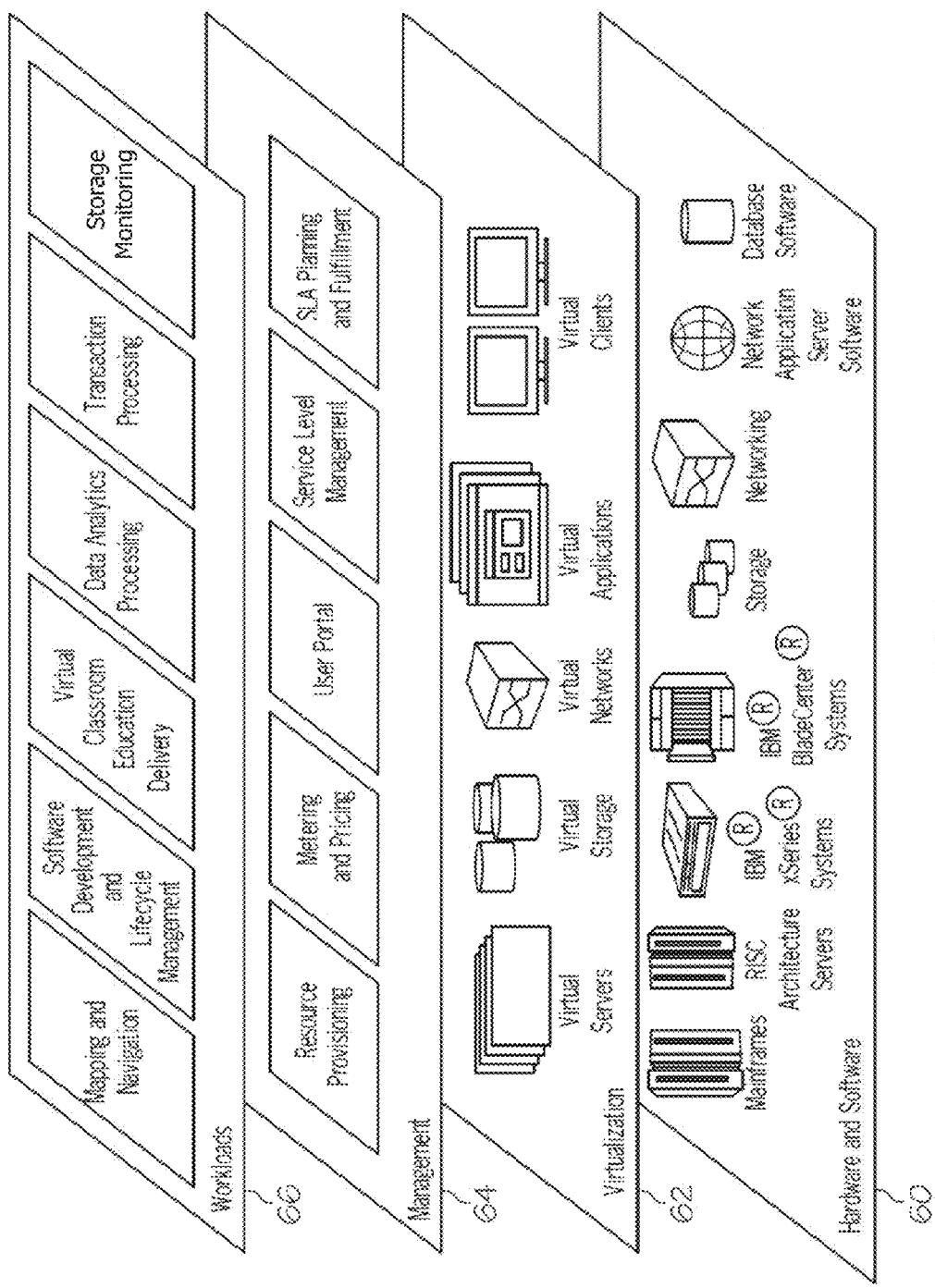
FIG. 3 shows abstraction model layers in accordance with aspects of the present invention.

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the invention are not limited thereto. As depicted, the following layers and corresponding functions are provided:

Hardware and software layer 60 includes hardware and software components. Examples of hardware components include mainframes, in one example IBM® zSeries® systems; RISC (Reduced Instruction Set Computer) architecture based servers, in one example IBM pSeries® systems; IBM xSeries® systems; IBM BladeCenter® systems; storage devices; networks and networking components. Examples of software components include network application server software, in one example IBM WebSphere® application server software; and database software, in one example IBM DB2® database software. (IBM, zSeries, pSeries, xSeries, BladeCenter, WebSphere, and DB2 are trademarks of International Business Machines Corporation registered in many jurisdictions worldwide). In accordance with aspects of the invention, the storage devices may include archive/backup storage 47 and/or monitoring apparatus 49.

Virtualization layer 62 provides an abstraction layer from which the following examples of virtual entities may be provided: virtual servers; virtual storage; virtual networks, including virtual private networks; virtual applications and operating systems; and virtual clients.

In one example, management layer 64 may provide the functions described below. Resource provisioning provides dynamic procurement of computing resources and other resources that are utilized to perform tasks within the cloud computing environment. Metering and Pricing provide cost tracking as resources are utilized within the cloud computing environment, and billing or invoicing for consumption of these resources. In one example, these resources may comprise application software licenses. Security provides identity verification for cloud users and tasks, as well as protection for data and other resources. User portal provides access to the cloud computing environment for users and system administrators. Service level management provides cloud computing resource allocation and management such that required service levels are met. Service Level Agreement (SLA) planning and fulfillment provide pre-arrangement for, and procurement of, cloud computing resources for which a future requirement is anticipated in accordance with an SLA.

Workloads layer 66 provides examples of functionality for which the cloud computing environment may be utilized. Examples of workloads and functions which may be provided from this layer include: mapping and navigation; software development and lifecycle management; virtual classroom education delivery; data analytics processing; transaction processing; and storage monitoring. In accordance with aspects of the invention, the storage monitoring may include one or more modules that interact with a user to identify and select particular data sections of one or more storage devices containing information that the user considers important and/or requires to be kept safe. The storage monitoring may determine a monitoring routine for each of the selected data sections, e.g., based on a level of importance assigned to the data sections by the user. Further, the storage monitoring may determine the low-level physical locations of the selected data sections.

Figure 4:
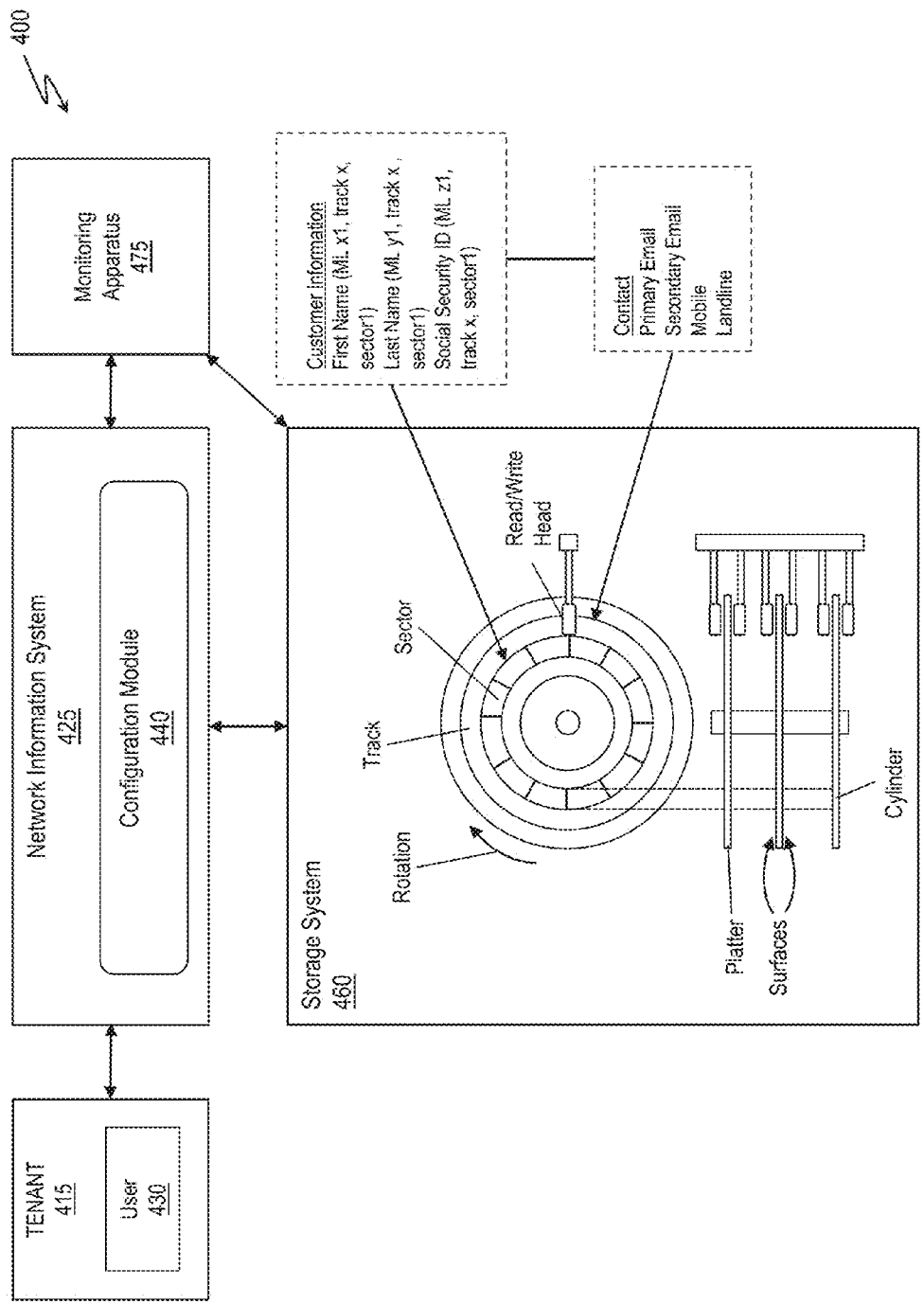
FIG. 4 shows an exemplary environment including a network information system in accordance with aspects of the present invention.

FIG. 4 illustrates a functional block diagram of a network environment 400, in accordance with aspects of the invention. In embodiments, network environment 400 includes a tenant 415, a network information system 425 (e.g., which may include computing system/server 12), storage system 460 (e.g., which may be archive/backup storage 47), and a monitoring apparatus 475 (e.g., which may be monitoring apparatus 49). Tenant 415 can be an individual, entity, or organization that is one of a number of clients of network information system 425. In embodiments, tenant 415 includes a user 430 (e.g., a user such as an information architect), which can be one or more individuals or entities responsible for securing information stored in archive/backup system hosted by network information system 425 for tenant 415. For example, user 430 may be an employee, organization and/or a customer authorized by tenant 415 to access its services at network information system 425.

Network information system 425 can, for example, be operated by a cloud service provider that provides a system as a service (SaaS), platform as a service (PaaS), and/or an infrastructure as a service (IaaS) to tenant 415. As shown in FIG. 4, network information system 425 can be communicatively linked to tenant 415. For example, as shown in FIG. 4, network information system can provide a user portal in management layer 64 though which user 430 accesses network information system 425.

In accordance with aspects of the invention, user 430 accesses a configuration module 440 (e.g., which may be configuration module 48) through network information system 425. Configuration module 440 may be program code (e.g., program module 42) included in a layer of a cloud computing environment, such as workloads layer 66 in FIG. 3. Using network information system 425 (e.g., through a user portal in management layer 64), user 430 can interact with configuration module 440 to determine data sections of storage system 460 (e.g., customer information, such as first name, last name, social security number, etc.) which are important and/or required to be safe. For example, configuration module 440 may display one or more data domains that included tenant's 415 respective information within storage system 460. Configuration module 440 may allow user 430 to navigate through hierarchical layers of tenant's 415 data domain to reach the locations of the lowest level of the data in storage system 460 (e.g., the location of an individual data sections, such as a first name, last name, and/or social security number of a particular individual). It will be understood that the data is not limited to this level of granularity, and other levels of data granularity are contemplated.

Configuration module 440 may display data sections (e.g., memory location ID (ML), track, and sector IDs) to user 430. For example, configuration module 440 may present a graphic-user interface that displays data sections included on hard disk drive in a hierarchical structure. From these, user 430 may select the data sections to be monitored. For example, based on policies and/or regulations of tenant 415, user 430 may consider a customer's first name, last name, and social security number to be important data that should be kept safe; whereas the other customer information, such as an email address or telephone number may not be as important to tenant 415 and, as such, user 430 may not select these for monitoring.

In accordance with aspects of the invention, configuration module 440 determines monitoring information for each of the selected data sections. In embodiments, the monitoring information includes an identifier, a level of importance, a monitoring routine, a storage device identifier, and a physical location for each of the selected data sections. The data section identifier may describe a type of data being protected (e.g., legal documents, CEO data, customer profiles, etc.). The level of importance may be a value assigned by user 430 that indicates the relative importance of a selected data section with respect to other data sections. For example, the level of importance may be a ranking between 1 and 5. Of course, the invention is not limited to this ranking method or relative scale, and one of ordinary skill in the art will understand that other rankings and/or scales can be used.

The monitoring routine is one or more intervals (e.g., daily, weekly, monthly) and/or events (e.g., hard disk drive power on/off cycles) that trigger monitoring of a data section. In embodiments, user 430 assigns the monitoring routines. For example, user 430 may assign monitoring routines to data sections via a graphic-user interface provided by configuration module 440. Additionally or alternatively, predefined (e.g., default) monitoring routines are assigned. For example, configuration module 440 may automatically assign monitoring routines to different types of data based on a predefined lookup table. Further, in embodiments, configuration module 440 determines the monitoring routines based on the importance level assigned by user 430. For example, configuration module 440 may include a lookup table that maps the different importance levels to respective monitoring routines.

The storage device identifier and the location define the physical location of a data section on a particular storage device. For example, as shown in FIG. 4, the track and sector of a hard disk drive containing each data section is stored is determined using, for example, CHS (Cylinder, Head, Sector) addressing or LBA (Logical Block Addressing).

Configuration module 440 may store the monitoring information in a data storage device (e.g., storage system 34 in FIG. 1) for future reference (e.g., in association with a tenant profile). Additionally, in accordance with aspects of the invention, configuration module 440 provides the monitoring information to a monitoring apparatus 475. Monitoring apparatus 475 is system, software, or a combination thereof that monitors the state of information stored in one or more data storage devices in archive/backup system. In embodiments, monitoring apparatus 475 is attached to each hard disk drive in storage system 460. While a single hard disk drive is shown in FIG. 4 for simplicity, storage system 460 may include different numbers and types of storage devices (e.g., tape drive, a disk storage device (e.g., hard disk drive), an optical disk storage device (e.g., a rewritable compact disc), a solid state drive, a flash drive, or an external hard drives, an external disk drive array, a RAID system, and a data archival storage systems).

By providing network environment 400, including network information system 425 that routinely monitors user-selected data sections of storage system 460, implementations of the invention allow very large data sets, such as those accumulated by archiving and/or backing-up data, to be monitored and corrective action to be taken in advance of data loss or corruption. Further, implementations of the invention allow tenants 415 of network information service 425 flexibility to select subsets of their data which they consider important and/or required and, further, allows them to strictly monitor the data they consider most important. As a result, loss or corruption of tenant's 415 data is avoided. In the event that data is lost or corrupted, tenant 415 is immediately notified so that mitigating action can be taken.

Figure 5:
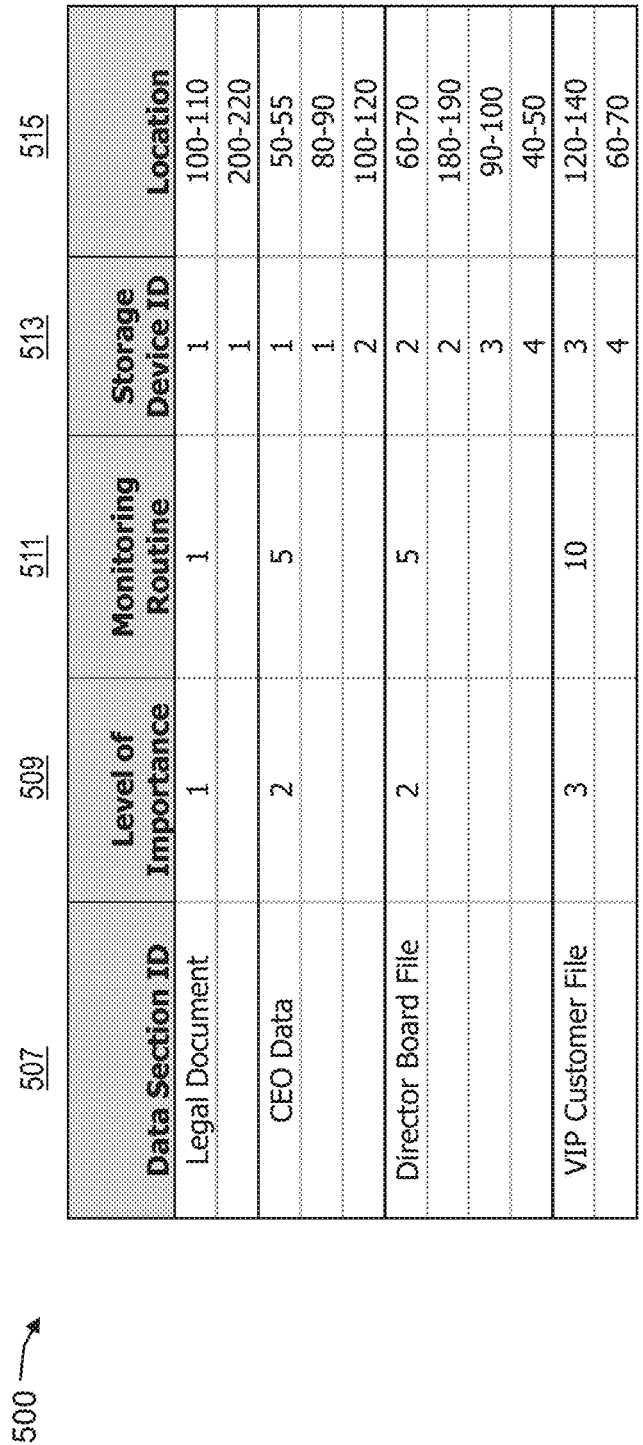
FIG. 5 shows an exemplary data structure for monitoring information in accordance with aspects of the present invention.

FIG. 5 shows an exemplary data structure including monitoring information 500 in accordance with aspects of the present invention. Monitoring information 500 can be specific to a particular tenant (e.g., tenant 415). As such, in a multi-tenant environment, each tenant can be associated with respective monitoring information 500. In embodiments, monitoring information 500 can be stored in the system memory (e.g., archive/backup storage 14 or storage system 34).

Monitoring information 500 can include some or all of the following columns: data section ID 507, level of importance 509, monitoring routine 511, storage device ID 513, and location 515. Although the information in data structure 500 is illustrated using alphanumeric characters, it is contemplated that the information can be stored other formats, for example, as machine code. Further, while the information in the monitoring information 500 is illustrated in separate columns of a data structure, this information may be stored and/or combined into one or more values.

Data section ID 507 can include data identifying information that is important and required to be kept safe. Level of importance 509 can include data identifying a corresponding level of importance for some or all information identified in data section ID 507. Monitoring routine 511 can include data corresponding to a frequency and/or events by which the information identified in data section ID 507 is to be monitored. Storage device ID 513 can include data identifying the particular device in a storage system in which the information identified in data section ID 507 is stored. Location 515 can include data identifying the particular location of the information identified in data section ID 507 with the corresponding one of the devices identified in column 513.

Some or all of monitoring information 500 may be provided by a user. For example, a user (e.g., user 430) may use a computer-user interface (e.g., provided by network information system 425 via configuration module 440) to identify data sections (e.g., of tenant 415) that are important and required to be kept safe; identify the particular location (e.g., block/track/sector) where that data sections are stored in one or more storage devices (e.g., storage system 460); and specify a level of importance and/or a monitoring routine for the data sections. Additionally or alternatively, some or all of monitoring information 500 may be determined automatically based on predefined parameters or rules. For example, embodiments may use predefined rules and parameters to identify and select data sections stored in one or more archive/backup systems based on user-defined keywords and assign a corresponding level of importance and/or monitoring interval.

Based on the information in monitoring information 500, a monitoring apparatus (e.g., monitoring apparatus 475) monitors a storage system (e.g., storage system 460). For instance, the monitoring apparatus can routinely measure fault parameters at physical locations (e.g., specified at storage device ID 513 and location 515). Measuring the fault parameters includes, e.g., measuring magnetic strength of data, measuring bit error rate and health check of the disk using SMART parameters.

Figure 6:
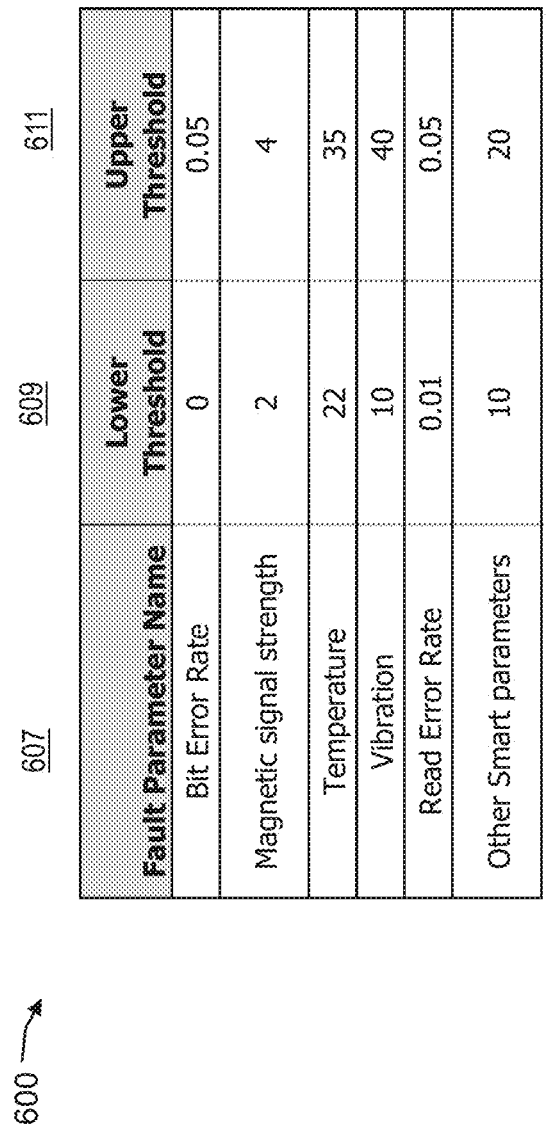
FIG. 6 shows an exemplary data structure for threshold information in accordance with aspects of the present invention.

FIG. 6 shows an exemplary data structure including threshold information 600 in accordance with aspects of the present invention. In embodiments, threshold information 600 is specific to a particular tenant (e.g., tenant 415). As such, in a multi-tenant environment, each tenant can be associated with respective threshold information 600. In embodiments, threshold information 600 can be stored in system memory (e.g., archive/backup storage 47 or storage system 34) or in the monitoring apparatus (e.g., monitoring apparatus 49/475).

Threshold information 600 can include some or all the following columns: fault parameter name 607, lower threshold 609, and upper threshold 611. Fault parameter name 607 can include data identifying one or more fault parameters that are monitored. Lower threshold 609 and upper threshold 611 can include data identifying a respective lower threshold and upper threshold for the fault parameters identified in column 607. Lower threshold 609 and upper threshold 611 corresponding to each fault parameter named in column 607 may be provided by a user (e.g., user 430) through, for example, a graphic user interface provided by configuration module 440. Alternatively, lower threshold 609 and upper threshold 611 for each fault parameter may be predefined by a provider of network information system (e.g., network information system 425).

Based on the information in threshold information 600, a monitoring apparatus (e.g., monitoring apparatus 49/475) determines whether information in a storage system (e.g., storage system 460 in archive/backup storage 47) may be corrupted and/or lost. Based on this determination, the monitoring apparatus may trigger the monitoring apparatus to take a corrective action and/or issue an alert. For instance, monitoring apparatus can periodically monitor user-specified data sections on a particular hard disk drive. If one or more fault parameters identified in column 607 (e.g., magnetic signal strength) is above or below the corresponding lower threshold 609 or upper threshold 611, respectively.

Figure 7:
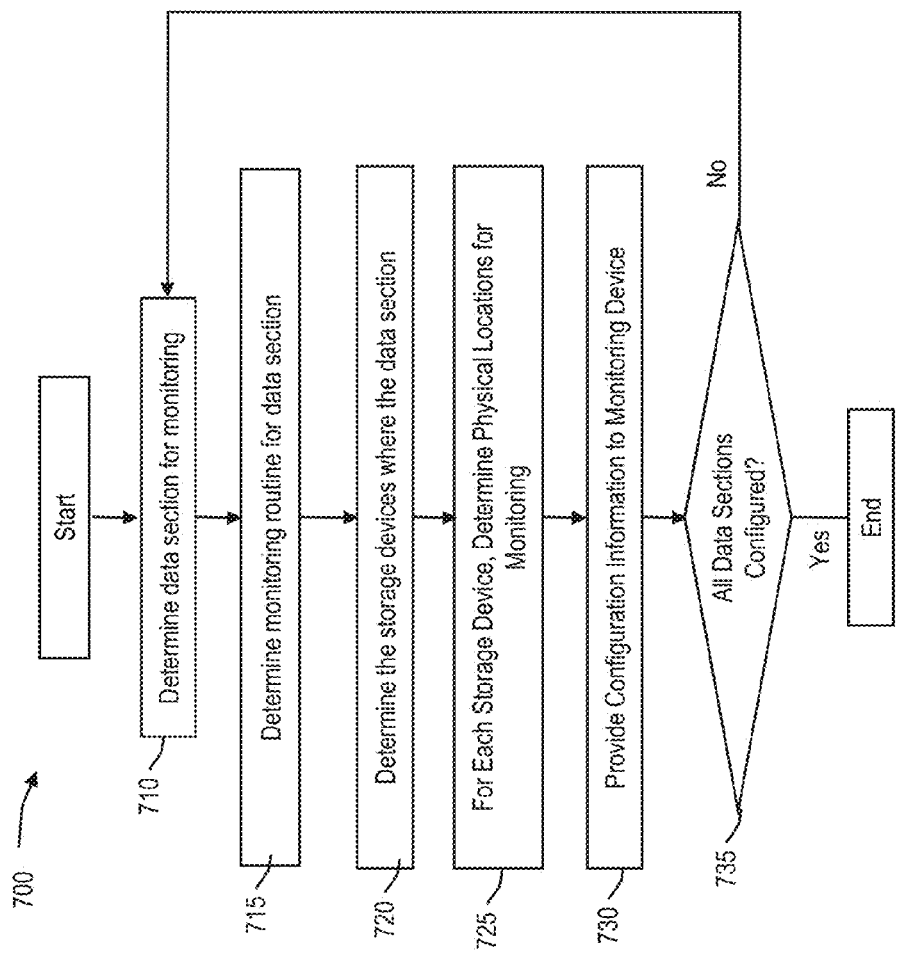
FIG. 7 shows a flow diagram of an exemplary process for configuring monitoring in accordance with aspects of the present invention.
Figure 8:
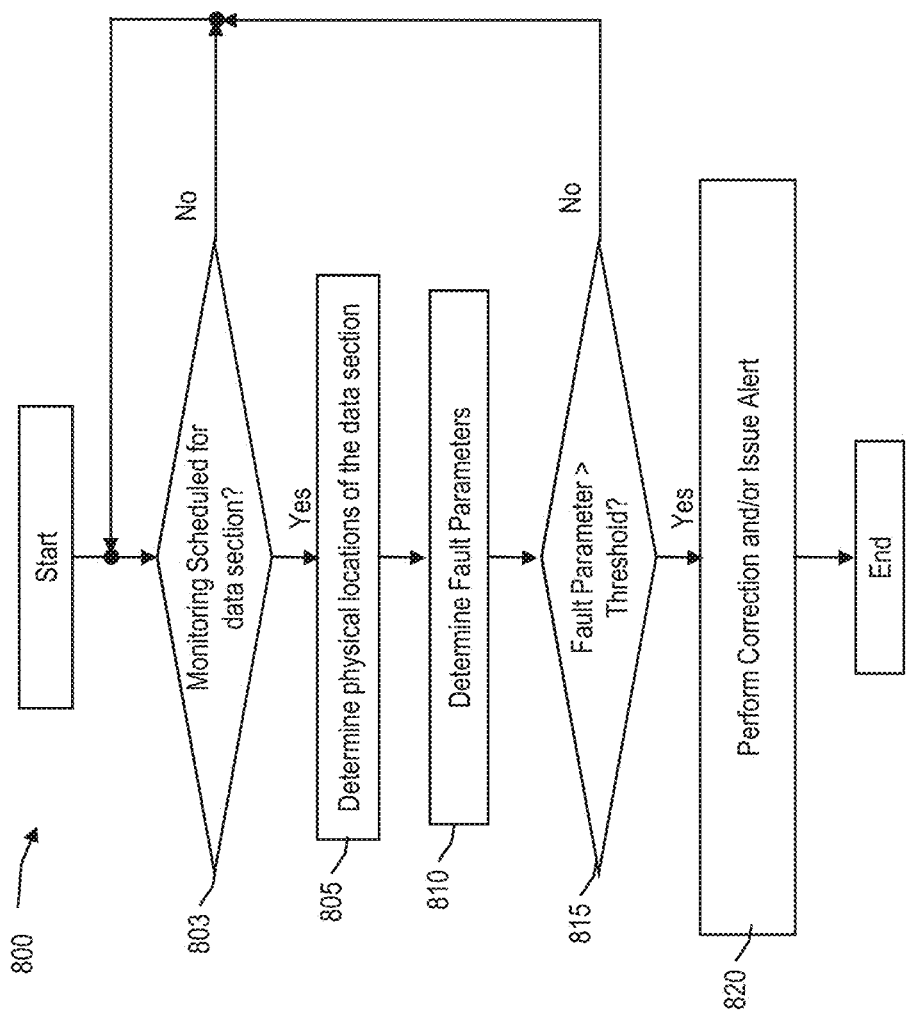
FIG. 8 shows a flow diagram of an exemplary process for performing monitoring in accordance with aspects of the present invention.

FIGS. 7 and 8 show exemplary flows for performing aspects of the present invention. The steps of FIGS. 7 and 8 can be implemented in any of the environments of FIGS. 1-4, for example.

The flowcharts in FIGS. 7 and 8 illustrate the architecture, functionality, and operation of possible implementations of systems, methods, and computer program products according to various embodiments of the present invention. In this regard, each block in the flowchart or block diagrams may represent a module, segment, or portion of code, which includes one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Furthermore, the invention can take the form of a computer program product accessible from a computer-usable or computer-readable medium providing program code for use by or in connection with a computer or any instruction execution system. The software and/or computer program product can be implemented in the environment of FIG. 1. For the purposes of this description, a computer-usable or computer readable medium can be any apparatus that can contain, store, communicate, propagate, or transport the program for use by or in connection with the instruction execution system, apparatus, or device. The medium can be an electronic, magnetic, optical, electromagnetic, infrared, or semiconductor system (or apparatus or device) or a propagation medium. Examples of a computer-readable storage medium include a semiconductor or solid state memory, magnetic tape, a removable computer diskette, a random access memory (RAM), a read-only memory (ROM), a rigid magnetic disk, and an optical disk. Current examples of optical disks include compact disk-read only memory (CD-ROM), compact disc-read/write (CD-R/W) and DVD.

FIG. 7 shows a flow diagram 700 of an exemplary process for configuring monitoring information for a storage system (e.g., archive/backup system 50) in accordance with aspects of the present invention. According to aspects of the invention, each tenant (e.g., tenant 415) of a network information system (e.g., network information system 410 provided by cloud computing node 10) can configure monitoring information for their data. Thus, tenants can customize the protection of the information they consider important (e.g., more important information can be more strictly monitored that less important information). At the same time, the cost of securing information in the storage system is reduced by monitoring only a subset of the total information.

The process of flow diagram 700 starts when a user initiates a configuration module. In embodiments, the user (e.g., user 430) may be an information architect of a tenant (e.g., tenant 415) that accesses the configuration module (e.g., configuration module 48/440) via a network service (e.g., network information system 425). At step 710, the configuration module determines data sections for monitoring. For example, the configuration module may provide a computer-user interface that presents information stored in a storage system (e.g., storage system 460 in backup/archive storage 47). The computer-user interface may allow the user to navigate through hierarchical structures of the data domains in which the user's data is organized to select data sections for monitoring. Additionally or alternatively, the configuration module may use predefined rules and parameters (e.g., keywords and look-up tables) to automatically select information that is important and/or required to be kept safe by the user. The automatic selections may be subsequently confirmed and changed by the user.

At step 715, the configuration module determines monitoring routines for the data sections determined at step 710. In embodiments, the user selects a monitoring routine for each data section that will be monitored (e.g., data section ID 507). Additionally or alternatively, predefined (e.g., default) monitoring routines are used. Further, in embodiments, the configuration module determines the monitoring routines based on importance levels (e.g., level of importance 509) assigned to the data sections by the user. For example, the configuration module may provide a computer-user interface that enables the user to select from several predefined monitoring routines or importance levels.

At step 720, the configuration module determines the storage devices (e.g., storage system 460) containing the selected data sections (e.g., from step 710). For example, the configuration module may search hard disk drives and determine identities (e.g., storage device ID 513) of the storage devices in which the selected data sections are stored. Further, at step 725, the configuration module determines the physical locations of the data sections within each storage device (e.g., location 515). The physical location may be blocks/sectors of a hard disk drive, which may be specified by, for example, LBA or CHS addressing information. At step 730, monitoring information (e.g., monitoring information 500), including the information determined at steps 710 . . . 725 above, is provided to a monitoring device (e.g., monitoring apparatus 475) for use in subsequent monitoring of the storage system.

At step 735, the configuration module determines whether the configurations of all data sections are complete. If so, the process ends. In not, the process returns to step 710 and repeats until there are no additional data sections that will be monitored. It should be noted that, while FIG. 7 shows an iterative process for configuring monitoring information of individual data sections, it is contemplated that, instead, the process may configure monitoring information for more than one data section simultaneously. By enabling a user, such as a tenant of an IaaS, to select particular data and data types that are important to the user for monitoring, the security of the tenant's important and/or required information is increased via routine monitoring while minimizing the cost of the IaaS for providing this additional protection.

FIG. 8 shows a flow diagram 800 of an exemplary process for monitoring information in accordance with aspects of the present invention. At step 803, a monitoring apparatus (e.g., monitoring apparatus 49/475) determines whether a data sector is scheduled for monitoring. In embodiments, the monitoring apparatus determines whether a data section is scheduled based on a predefined monitoring routine (e.g., monitoring routine 511) specified by a user (e.g., monitoring information 500) that has been provided from a configuration module (e.g., configuration module 48/440) as described above with respect to FIGS. 1, 4, and 7, and more particularly at step 730 of FIG. 1. For example, the data section may be scheduled for monitoring after a time interval (e.g., one day) or after a number of events (e.g., fifty on/off power cycles of a hard disk drive). If the data section is not scheduled for monitoring, then the process flow returns to the beginning and restarts at step 803. Otherwise, if the data section is schedule for monitoring, at step 805, the monitoring apparatus determines the physical locations of the data section. For example, the monitoring apparatus may determine that the data section resides in a particular sector of a hard disk drive based monitoring information (e.g., monitoring information 500).

At step 810, the monitoring apparatus determines the fault parameters of the blocks/sectors determined in step 805. For example, the monitoring apparatus may determine the fault parameters by measuring the bit error rate, the read error rate, the magnetic signal strength, temperature, and vibration of the hard disk drive (e.g., storage system 460 in backup/archive storage 47) at the sector where the data section is recorded. At step 815, the monitoring apparatus determines whether any of the fault parameters determined in step 810 exceed one or more threshold values. For example, the threshold values may be stored in a predetermined list that associates the threshold values (e.g., lower threshold 609 and upper threshold 611) with fault parameters (e.g., threshold information name 607). If the one of the fault parameters determined in step 810 does not exceed a corresponding threshold (i.e., not under lower threshold 609 or not over upper threshold 611), then the process flow returns to step 803 and restarts until a data section is scheduled for monitoring. However, if the one of the fault parameters exceeds its corresponding threshold (i.e., under lower threshold 609 or over upper threshold 611), then corrective action is taken and/or an alert is issued at step 820. For example, in the event a threshold for bit error rate is exceeded, local correction may be overwriting the data in the corresponding data section. If local correction does not correct the problem and/or if the problem persist longer even after a predetermined number of local corrections, an alert can be issued (e.g., to network information system 425 and/or tenant 430) to initiate mitigating action. For example, the monitoring apparatus may send a message with information identifying data element and memory locations and track details.

In embodiments, a service provider, such as a Solution Integrator, could offer to perform the processes described herein. In this case, the service provider can create, maintain, deploy, support, etc., the computer infrastructure that performs the process steps of the invention for one or more customers. These customers may be, for example, any business that uses technology. In return, the service provider can receive payment from the customer(s) under a subscription and/or fee agreement and/or the service provider can receive payment from the sale of advertising content to one or more third parties.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method, comprising:
presenting, by a computer device, a graphic-user interface that displays a plurality of data sections included on a storage system in a hierarchical structure, wherein the storage system comprises a plurality of hard disk drives;
receiving, by the computer device, a user selection of a data section from the displayed plurality of data sections;
determining, by the computer device, a monitoring routine for the data section;
determining, by the computer device, a physical location at which the data section is recorded in the storage system; and
monitoring, by the computer device, the physical location for faults according to the monitoring routine.

2. The method of claim 1, wherein the determining the physical location comprises determining a block and a sector of at least one of the plurality of hard disk drives at which the data section is recorded.

3. The method of claim 1, further comprising:
using predefined rules and parameters to automatically select information included on a storage system; and
receiving confirmation of the automatic selection by the user.

4. The method of claim 1, further comprising determining monitoring information for the selected data section, wherein the monitoring information includes:
an identifier;
a level of importance;
the monitoring routine;
a storage device identifier; and
a physical location of the selected data section.

5. The method of claim 4, wherein the identifier describes a type of data being protected.

6. The method of claim 4, wherein the level of importance is a value assigned by the user that indicates a relative importance of the selected data section.

7. The method of claim 4, wherein the monitoring routine defines at least one of an interval and an event that triggers monitoring of the selected data section.

8. The method of claim 1, wherein the determining the monitoring routine comprises receiving a selection of the monitoring routine from the user.

9. The method of claim 1, wherein the determining the monitoring routine comprises:
receiving an importance level from the user; and
determining the monitoring routine based on the importance level.

10. The method of claim 1, wherein the monitoring routine is based on a number of events.

11. The method of claim 1, wherein the monitoring the physical location for faults comprises measuring a parameter of the physical location, the parameter being one of: bit error rate, magnetic signal strength, temperature, vibration, and read error rate.

12. The method of claim 1, wherein the monitoring the physical location for faults comprises:
measuring a fault parameter at the physical location;
determining whether the fault parameter exceeds a threshold; and
initiating corrective action when the fault parameter exceeds the threshold.

13. A system for selective monitoring of stored information, comprising:
a configuration module;
a monitoring apparatus; and
a storage system including a plurality of hard disk drives, wherein,
the configuration module presents a graphic-user interface that displays a plurality of data sections included on the storage system in a hierarchical structure;
the configuration module receives a user selection of a data section from the displayed plurality of data sections;
the configuration module determines a monitoring routine for the user-selected data section;
the configuration module determines a physical location at which the user-selected data section is recorded in the storage system;
the monitoring apparatus receives the monitoring routine and the physical location from the configuration module; and
the monitoring apparatus monitors the physical location for faults according to the monitoring routine.

14. The system of claim 13, wherein the configuration module determines the monitoring routine by receiving a selection of the monitoring routine from a user.

15. The system of claim 13, wherein the determining the physical location comprises determining a block and a sector of at least one of the plurality of hard disk drives at which the data section is recorded.

16. The system of claim 13, further comprising:
using predefined rules and parameters to automatically select information included on a storage system; and
receiving confirmation of the automatic selection by the user.

17. The system of claim 13, further comprising determining monitoring information for the selected data section, wherein the monitoring information includes:
an identifier;
a level of importance;
the monitoring routine;
a storage device identifier; and
a physical location of the selected data section.

18. The system of claim 13, wherein:
the identifier describes a type of data being protected;
the level of importance is a value assigned by the user that indicates a relative importance of the selected data section; and
the monitoring routine defines at least one of an interval and an event that triggers monitoring of the selected data section.

19. A computer program product for selective monitoring of stored information, the computer program product comprising:
one or more computer readable hardware storage devices;
program code, stored on at least one of the one or more computer readable hardware storage devices, to determine a plurality of user-selected data sections recorded in a storage system by: presenting a graphic-user interface that displays a plurality of data sections included on the storage system in a hierarchical structure; and receiving a selection of the plurality of user-selected data sections from the displayed plurality of data sections;
program code, stored on at least one of the one or more computer readable hardware storage devices, to determine a respective monitoring routine for each respective one of the plurality of user-selected data sections;
program code, stored on at least one of the one or more computer readable hardware storage devices, to determine physical locations of the storage system at which the plurality of user-selected data sections are recorded in the storage system; and
program code, stored on at least one of the one or more computer readable hardware storage devices, to monitor the physical locations for faults based on the respective monitoring routines.

* * * * *